Patented Dec. 16, 1952

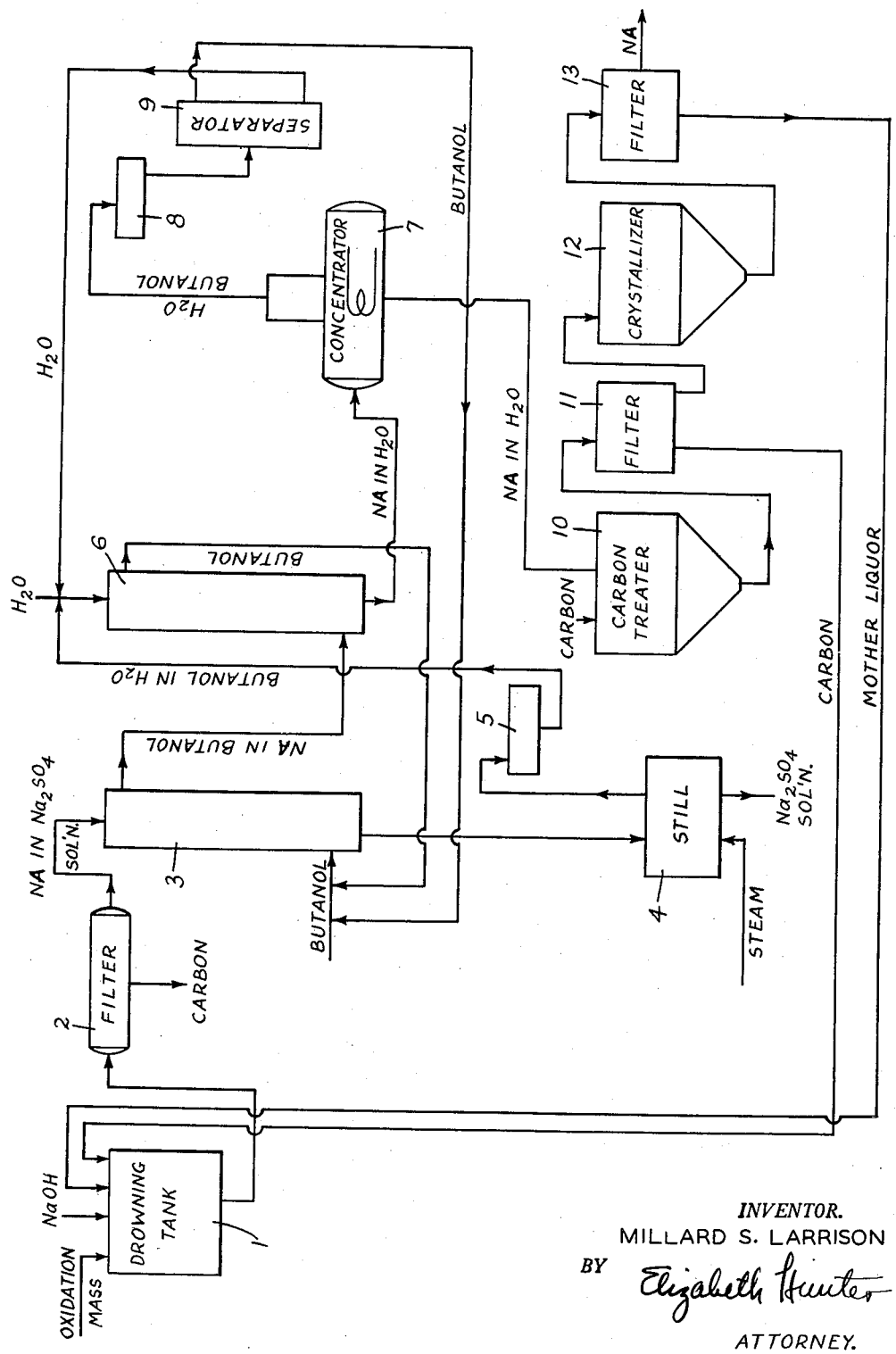

2,622,085

UNITED STATES PATENT OFFICE 2,622,085

RECOVERY OF NICOTINIC ACID BY SOLVENT EXTRACTION

Millard S. Larrison, Whippany, N. J., assignor to Allied Chemical & Dye Corporation, New York, N. Y., a corporation of New York Application July 21, 1949, Serial No. 106,010

13 Claims. (Cl. 260—295.5)

This invention relates to the recovery of nicotinic acid from aqueous solutions thereof containing inorganic impurities.

It is known to produce pyridine carboxylic acids by the oxidation of N-heteroaryl compounds having an oxidizable organic grouping attached to the nitrogen-containing aromatic nucleus by at least one carbon-to-carbon linkage. Of these pyridine carboxylic acids, nicotinic acid is probably the best known at the present time, being a member of the vitamin B complex. Nicotinic acid is generally produced by the oxidation of quinoline or a beta alkyl pyridine, such as beta picoline, with an inorganic oxidizing agent such as potassium permanganate, nitric acid or sulfuric acid.

The reaction products obtained in such processes contain, in addition to the desired nicotinic acid, considerable amounts of water-soluble inorganic impurities, in the form of salts, for example, sodium or ammonium sulfate, etc., which are formed upon partially neutralizing the oxidation mass preliminary to recovery of the nicotinic acid therefrom. Such inorganic impurities must be removed to obtain a U. S. P. grade of nicotinic acid.

Heretofore, removal of such impurities has been accomplished by precipitating the nicotinic acid as copper nicotinate, separating the copper nicotinate from the aqueous solution containing the inorganic impurities and then recovering nicotinic acid from the copper nicotinate by treatment of the copper salt with hydrogen sulfide or by reaction thereof with sodium hydroxide followed by acidification. This recovery method, however, is somewhat cumbersome, since it involves recovery of the precipitated copper nicotinate and subsequent conversion thereof back to nicotinic acid.

It is an object of this invention to provide a simple and effective method for recovering nicotinic acid from aqueous solutions thereof containing water-soluble inorganic impurities.

It is a further object of my invention to provide a method for recovering nicotinic acid from solutions thereof containing sodium or ammonium sulfate.

In accordance with my invention, nicotinic acid is recovered from an aqueous solution thereof containing water-soluble inorganic impurities such as inorganic salts of mineral acids, particularly alkali metal or ammonium sulfates and the like, by extracting the nicotinic acid from the solution with a normally liquid saturated aliphatic alcohol containing from four to six carbon atoms, inclusive, and having at least a slight solubility in water at 20° C., but not more than about 125 grams per liter of water. Although, in general, nicotinic acid is less soluble in such alcohols than in water, I have found that when such alcohols are contacted with an aqueous pyridine carboxylic acid solution containing inorganic impurities, particularly those of the character of sodium sulfate or the like, the water which dissolves in the alcohol produces a mixed alcohol water phase in which the nicotinic acid is surprisingly soluble; more so than in the water solution containing the impurities as described, and so much so, particularly at elevated temperatures, that substantially quantitative extraction of the nicotinic acid, free of inorganic impurities, from the aqueous solution may be accomplished with use of moderate amounts of the alcohol solvent. The nicotinic acid may then be recovered from the alcoholic solution either by evaporating the solvent in any suitable manner or by re-extracting the acid from the alcoholic solution with water.

Since it has been found that production of nicotinic acid by oxidation of N-heteroaryl substances such as beta picoline or quinoline with sulfuric acid in the presence of a catalyst is an extremely effective manner of producing this acid, a preferred embodiment of my invention involves recovery of nicotinic acid from the oxidation mass produced in this manner by adjusting the pH value of the oxidation mass to a point near the isoelectric point of the nicotinic acid, namely, between about 3.0 and about 4.0 and then extracting the mass with an alcohol of the type above described.

The nicotinic acid solution treated in accordance with this invention may be any aqueous solution of nicotinic acid containing water-soluble inorganic impurities of the character described, from which it is desired to recover the acid. The solution treated should contain substantially all the nicotinic acid in the form of the free acid and, in addition, should be practically free of unneutralized inorganic acids such as sulfuric or nitric acid. Accordingly, the pH value of the solution treated should be at approximately the isoelectric point as brought out above, i. e., between about 3.0 and about 4.0, preferably about 3.5, and, if necessary, alkali or acid should be added to the aqueous solution in order to bring the pH value to within this range before contact with the aliphatic alcohol. If desired, the nicotinic acid solution may be subjected to preliminary purification treatments, for example, a decolorization treatment with active carbon, prior to treatment of the solution with aliphatic alcohol.

As above noted, the aliphatic alcohol employed in accordance with my invention may be any normally liquid saturated aliphatic alcohol containing from four to six carbon atoms, inclusive, and having at least a slight solubility in water at 20° C. but not more than about 125 grams per liter, or mixtures of such alcohols. Thus 1 or 2 butanol, iso-butyl alcohol, the pentanols and the hexanols, including cyclohexanol, may be employed in accordance with this invention. Tertiary butyl alcohol is not suitable for use in accordance with this invention because of its high solubility in water, this being greater than the limitation mentioned above. n-Butanol is preferably employed in the practice of my invention. Another preferred solvent which may advantageously be used, is the mixture of pentanols sold under the trade name "Pentasol," the approximate analysis of which is as follows: 1-pentanol, 26%; 2-pentanol, 8%; 3-pentanol, 18%; 3-methyl-1-butanol, 16%; and 2-methyl-1-butanol, 32%.

Extraction of the aqueous nicotinic acid solution with the saturated aliphatic alcohol in accordance with the invention is preferably effected by passing the nicotinic acid-containing solution and alcohol solvent countercurrently through a suitable vessel to effect close liquid-liquid contact. In this extraction I prefer to use an excess of alcohol solvent over the nicotinic acid-containing solution, preferably in the ratio of between somewhat above 1 volume of alcohol to 1 volume of nicotinic acid-containing solution and about 1.5 volumes of alcohol to 1 of nicotinic acid-containing solution. Larger excesses of alcohol may be used if desired but this practice presents the disadvantage of requiring the handling of larger volumes of solvent, and of recovering larger quantities of alcohol for reuse. The temperature at which extraction is carried out may vary between about 40° and about 100° C. depending, inter alia, on the alcohol used, and I have found that the use of elevated temperatures of the order of 65° to 95° C. improves the solubility of nicotinic acid in the alcohol solvent and minimizes any tendency for inorganic impurities such as sodium sulfate to precipitate. The aqueous raffinate stripped of its nicotinic acid content is removed from the extraction vessel and may be discarded, although it is usually desirable to treat this raffinate, for example, by steam distillation, to recover any of the alcohol solvent dissolved therein.

The alcoholic solution of nicotinic acid thus obtained may be treated in any suitable manner to recover the nicotinic acid and the alcohol solvent. Thus the alcohol may be evaporated from the nicotinic acid to produce a substantially dry residue containing a small amount of alcohol therein; the dried acid may then be either taken up in water and recovered by crystallization or agitated with water to form a slurry, which is then centrifuged, the residual alcohol being separated from the acid in the aqueous phase; or the alcohol solution may be partially evaporated to a slurry and a crude, dry nicotinic acid then produced by drum drying the slurry. In both the above instances, it is desirable that the alcohol evaporated be condensed for re-use in order to improve the economics of the process. The alcohol solution may, if desired, be partially evaporated until the rate of evaporation slows down appreciably, and the residue then steam distilled to remove the remaining alcohol and to form an aqueous nicotinic acid solution, which may be passed to a crystallizer to recover the acid. The distillates from the evaporation and steam distillation may be combined and condensed, the alcohol layer recovered for re-use and the aqueous layer, containing a small amount of alcohol dissolved therein, used in a subsequent steam distillation.

My preferred procedure, however, for recovering the nicotinic acid from the alcoholic solution is to extract such solution with water, preferably at temperatures which result in effective transfer of nicotinic acid from the alcohol to the water solution. While such transfer may satisfactorily be effected at temperatures from about 55° C. up to about the boiling point of the alcohol used, I prefer to carry out the extraction at temperatures between about 65° C. and 95° C. At weight ratios of water to alcohol solution above about 1 to 1 a high degree of transfer of nicotinic acid to the water phase may be achieved. I prefer to use countercurrent extraction with an excess of water over alcohol solution, preferably a ratio of about 1.5 of water to 1 of alcohol, at which ratio substantially complete transfer is obtained. Larger excesses of water may be used if desired and improve the efficiency of transfer somewhat, but this practice also presents the difficulty of recovering the acid from more dilute solutions. The aqueous solution of nicotinic acid thus formed may then be concentrated, cooled and subjected to crystallization or other treatment to recover the acid.

The accompanying drawing illustrates diagrammatically a flow sheet of the preferred embodiment of this invention. As shown in the drawing, crude oxidation mass resulting, for example, from catalytic sulfuric acid oxidation of beta picoline or quinoline and containing nicotinic acid, sulfuric acid, etc., is introduced into drowning tank 1, containing an excess of water, for example, between about 5 and about 10 times the volume of nicotinic acid solution, along with sodium hydroxide in amounts sufficient to form a solution having a pH value of about 3.5, thereby neutralizing the bulk of the unreacted sulfuric acid, forming sodium sulfate, but leaving substantially all of the nicotinic acid in unneutralized form. Active carbon and mother liquor, recovered from subsequent steps in the operation, are then introduced into drowning tank 1 and the mass thoroughly agitated. From drowning tank 1 the slurry passes to filter 2, in which the active carbon is removed and discarded. The aqueous solution of nicotinic acid and sodium sulfate is then heated to a temperature between 95° C. and 100° C. and introduced into the top of column 3; n-butanol, heated to a temperature of about 45° C., is introduced at the bottom of the column, the butanol and aqueous solution thereby passing countercurrently through column 3; the temperature of the column varies from 80° to 100° C. at the top to about 45° C. at the bottom.

The aqueous solution, stripped of its nicotinic acid, may be discarded or it may be treated to recover the dissolved butanol in which case it is passed from column 3 to still 4, wherein it is steam distilled to remove the butanol. The stripped aqueous sodium sulfate solution is then either discarded or the sodium sulfate contained therein recovered. The water distillate containing traces of butanol is condensed in condenser 5 and passed to the top of column 6; where it is admixed with additional water and the mixture heated to about 75° C. The mixture, consisting primarily of water, is then introduced into the top of column 6. The solution of nicotinic acid in butanol, withdrawn from column 3 is introduced at a temperature of about 75° C. into the bottom of column 6, and passes upwardly therethrough countercurrent to the descending stream of water, giving up its nicotinic acid to the water phase. The solution of nicotinic acid in water, free of inorganic impurities, is withdrawn from the bottom of column 6 and is passed to concentrator 7 for treatment described below. n-Butanol, stripped of its nicotinic acid content, is withdrawn from the top of column 6 and returned to column 3 for re-use therein.

In concentrator 7 the aqueous nicotinic acid solution is evaporated to a concentration of between about 5% and about 10% nicotinic acid. The distillate passing from this concentrator, consisting of butanol and water, is condensed in condenser 8 and passed to separator 9, wherein the condensate is permitted to settle, an aqueous layer and a butanol layer being formed; the aqueous layer is withdrawn from separator 9 and returned to column 6, as shown, wherein it is used for extracting nicotinic acid from solutions thereof in butanol. The butanol layer from separator 9 is returned to column 3 for re-use.

The concentrated aqueous nicotinic acid solution from concentrator 7 is passed to treater 10, in which it is agitated with activated carbon. The slurry is then passed to filter 11, wherein the carbon is removed by filtration, the carbon filter cake being used in drowning tank 1 to decolorize the crude oxidation mass. The aqueous nicotinic acid solution is passed from filter 11 to crystallizer 12, wherein it is cooled to crystallize the acid; pure nicotinic acid is recovered from the cooled slurry in filter 13, the mother liquor being returned to drowning tank 1.

The following example is illustrative of my invention:

EXAMPLE

A reaction mass containing nicotinic acid and free sulfuric acid, resulting from oxidation of quinoline with sulfuric acid in the presence of a selenium catalyst, was drowned in about 8 volumes of water and caustic soda was added thereto to produce a solution having a pH value of 3.5; this solution was then agitated with activated carbon and filtered. The filtrate, containing 0.325 pounds of nicotinic acid per gallon, was preheated to a temperature of 95° C. and then pumped into the top of an 11 ft. column packed with 9.65 ft. of ½" Berl porcelain saddles and filled with n-butanol at a temperature of 50° C., the filtrate being introduced at a rate of 7.5 gallons per hour. Introduction of n-butanol into the bottom of the tower was also commenced, the butanol being fed to the column at a temperature of 45° C. and at a rate of 10 gallons per hour. The aqueous solution and n-butanol passed through the column countercurrently, a butanol extract containing the nicotinic acid dissolved therein being withdrawn from the top of the column, and an aqueous raffinate being removed from the bottom of the column and discarded.

The butanol extract withdrawn from the top of the column was passed to the bottom of a second column 12 ft. high and packed with 10 ft. of ½" Berl porcelain saddles, the extract being introduced at a temperature of 75° C. and at a rate of 10 gallons per hour; water, also preheated to a temperature of 75° C., was pumped into the top of the column at a rate of 15 gallons per hour, the water and butanol extract thus passing countercurrently through the column. The butanol raffinate withdrawn from the top of this column was recovered for re-use in extracting additional quantities of crude aqueous nicotinic acid solution. The aqueous extract withdrawn from the bottom of the column was concentrated by evaporation to produce a liquor containing 0.5 pound of nicotinic acid per gallon; the concentrated solution was then decolorized with activated carbon and filtered. The filtrate was cooled to 5° C. and the nicotinic acid which crystallized was recovered in a centrifuge, the mother liquor being recovered for use in drowning subsequent crude oxidation products. The nicotinic acid thus obtained had a melting point of 236.5° C. and analyzed substantially 100% nicotinic acid; it contained virtually no sodium sulfate, chlorides or heavy metals.

As brought out above, it is indeed surprising that nicotinic acid can be extracted efficiently substantially quantitatively since solubility of nicotinic acid in these alcohols is less than its solubility in water. The efficiency obtained by such extraction is made possible by the surprising discovery that the solubility of nicotinic acid in the alcohols saturated with water, is greater than that in the anhydrous alcohols, especially at elevated temperatures as indicated in Table I below:

*Table I*

[Approximate Solubilities of Nicotinic Acid in (a) water, and (b) aliphatic alcohols substantially water free, and (c) aliphatic alcohols saturated with water, at normal and at elevated temperatures, respectively]

| Solvent Medium | Solubility, grams Nicotinic Acid per 100 grams Solvent | | | | | | | | | |
|---|---|---|---|---|---|---|---|---|---|---|
| | 20–26° C. | | 40° C. | | 65° C. | | 70° C. | | 90–91° C. | |
| | Dry | Wet | Dry | Wet | Dry | Wet | Dry | Wet | Dry | Wet |
| Water | | 1.7 | | 2.5 | | 5.0 | | 5.5 | | 9.0 |
| N-Butanol | .7 | 1.5 | 1.3 | 2.5 | 3.0 | 6.3 | 3.5 | 7.0 | 6.3 | 14.5 |
| N-Hexanol | 1.0 | 1.1 | | | | | | | 5.5 | 8.3 |
| 2-Methyliso-butylcarbinol | 1.0 | 1.2 | | | | | | | 5.3 | 9.1 |
| 2-Ethyl-1-butanol | 1.0 | 1.1 | | | | | | | 5.2 | 8.1 |
| Mixed Pentanols (Pentasol) | | | | | | | | | 4.9 | 11.5 |

The term "normally liquid aliphatic alcohol" is used throughout the specification and claims to denote an aliphatic alcohol which is liquid at a temperature of 20° C.

Since certain changes may be made in carrying out the above process without departing from the scope of the invention, it is intended that all matter contained in the above description

I claim:

1. In a process for recovering nicotinic acid from an aqueous solution thereof containing water-soluble inorganic impurities, the steps which comprise extracting at an initial pH value between about 3.0 and about 4.0 the aqueous solution with a water-wet normally liquid saturated aliphatic alcohol containing from four to six carbon atoms inclusive, and having a solubility in water at 20° C. of not more than about 125 grams per liter, whereby a solution of nicotinic acid in the alcohol substantially free of inorganic impurities is obtained.

2. In a process for recovering nicotinic acid from an aqueous solution thereof containing water-soluble inorganic impurities and having a pH value between about 3.0 and about 4.0, the steps which comprise extracting the aqueous solution with a water-wet normally liquid saturated aliphatic alcohol containing from four to six carbon atoms inclusive, and having a solubility in water at 20° C. of not more than about 125 grams per liter, whereby a solution of nicotinic acid in the alcohol substantially free of inorganic impurities is obtained, and recovering nicotinic acid from the alcohol solution thereof.

3. In a process for recovering nicotinic acid from an aqueous solution thereof containing sodium sulfate and having a pH value between about 3.0 and about 4.0 the steps which comprise countercurrently extracting the aqueous solution with a water-wet normally liquid saturated aliphatic alcohol containing from four to six carbon atoms inclusive, and having a solubility in water at 20° C. of not more than about 125 grams per liter, at temperatures between about 40° C. and about 100° C., whereby a solution of nicotinic acid in the alcohol substantially free of inorganic impurities is obtained, and then extracting said solution with water at temperatures between about 55° C. and about 95° C., so as to produce an aqueous solution of nicotinic acid substantially free of inorganic impurities.

4. In a process for recovering nicotinic acid from an aqueous solution thereof containing water-soluble inorganic impurities, the steps which comprise adjusting the pH value to between about 3.0 and about 4.0, extracting the aqueous solution with water-wet n-butanol, whereby a solution of nicotinic acid in the butanol substantially free of inorganic impurities is obtained, and recovering nicotinic acid from the butanol solution thereof.

5. In a process for recovering nicotinic acid from an aqueous solution thereof containing sodium sulfate and having a pH value between about 3.0 and about 4.0, the steps which comprise extracting the aqueous solution with water-wet n-butanol at a temperature between about 40° C. and about 100° C., whereby a solution of nicotinic acid in the butanol substantially free of inorganic impurities is obtained, and then extracting said solution with water at a temperature between about 55° C. and about 95° C., so as to produce an aqueous solution of nicotinic acid substantially free of inorganic impurities.

6. In a process for recovering nicotinic acid from an aqueous solution thereof containing water-soluble inorganic impurities, the steps which comprise adjusting the pH value to between about 3.0 and about 4.0, extracting the aqueous solution with a water-wet pentanol, whereby a solution of nicotinic acid in the pentanol substantially free of inorganic impurities is obtained, and recovering nicotinic acid from the pentanol solution thereof.

7. In a process for recovering nicotinic acid from an aqueous solution thereof containing sodium sulfate and having a pH value between about 3.0 and about 4.0, the steps which comprise extracting the aqueous solution with a water-wet pentanol at a temperature between about 40° C. and about 100° C., whereby a solution of nicotinic acid in the pentanol substantially free of inorganic impurities is obtained, and then extracting said solution with water at a temperature between about 55° C. and about 95° C., so as to produce an aqueous solution of nicotinic acid substantially free of inorganic impurities.

8. In a process for recovering nicotinic acid from an aqueous solution thereof containing free sulfuric acid, the steps which comprise adjusting the pH value of the solution to between about 3.0 and about 4.0 by the addition of an alkali, and extracting said solution with a water-wet normally liquid saturated aliphatic alcohol containing from four to six carbon atoms inclusive, and having a solubility in water at 20° C. of not more than about 125 grams per liter, whereby a solution of nicotinic acid in the alcohol and substantially free of inorganic impurities is obtained.

9. In a process for the recovery of nicotinic acid from an aqueous solution thereof containing free sulfuric acid, the steps which comprise adjusting the pH value of the solution to between about 3.0 and about 4.0 by the addition of an alkali, countercurrently extracting said solution with water-wet n-butanol at a temperature of between about 40° C. and about 100° C., withdrawing the butanol extract containing the nicotinic acid but substantially no alkali metal sulfate, countercurrently contacting said butanol extract with water at a temperature between about 55° C. and about 95° C. so as to strip the butanol extract of its nicotinic acid content, recovering the stripped butanol and recycling it for contact with further quantities of the aqueous crude nicotinic acid solution, and recovering pure nicotinic acid from the aqueous extract thus formed.

10. In a process for the recovery of nicotinic acid from an aqueous solution thereof containing free sulfuric acid, the steps which comprise adjusting the pH value of the solution to between about 3.0 and about 4.0 by the addition of sodium hydroxide, countercurrently contacting the resulting solution with water-wet n-butanol at a temperature between about 65° C. and about 95° C., using a butanol: water ratio greater than 1:1, withdrawing the butanol extract containing the nicotinic acid substantially free from sodium sulfate, thereafter countercurrently contacting said butanol extract with water at a temperature between about 55° C. and about 95° C. using a water:butanol ratio greater than 1:1, whereby the nicotinic acid is transferred substantially completely to the water phase, and recovering the nicotinic acid from the aqueous solution.

11. In a process for recovering nicotinic acid from an aqueous solution thereof containing at least one of an alkali metal sulfate and ammonium sulfate and having a pH value between about 3.0 and about 4.0, the steps which comprise countercurrently extracting the aqueous solution with a water-wet normally liquid saturated aliphatic alcohol containing from four to six carbon atoms inclusive, and having a solubility in water at 20° C. of not more than about 125 grams per liter, at temperatures between about 40° C. and about 100° C., whereby a solution of nicotinic acid in the alcohol substantially free of inorganic impurities is obtained, and then extracting said solution with water at temperatures between about 55° C. and about 95° C. so as to produce an aqueous solution of nicotinic acid substantially free of inorganic impurities.

12. In a process for recovering nicotinic acid from an aqueous solution thereof containing ammonium sulfate and having a pH value between about 3.0 and about 4.0, the steps which comprise countercurrently extracting the aqueous solution with a water-wet normally liquid saturated aliphatic alcohol containing from four to six carbon atoms inclusive, and having a solubility in water at 20° C. of not more than about 125 grams per liter, at temperatures between about 40° C. and about 100° C., whereby a solution of nicotinic acid in the alcohol substantially free of inorganic impurities is obtained, and then extracting said solution with water at temperatures between about 55° C. and about 95° C., so as to produce an aqueous solution of nicotinic acid substantially free of inorganic impurities.

13. In a process for recovering nicotinic acid from an aqueous solution thereof containing water-soluble inorganic impurities, the steps which comprise extracting at an initial pH value between about 3.0 and about 4.0 the aqueous solution at temperatures between about 40° C. and about 100° C. with a water-wet normally liquid saturated aliphatic alcohol containing from four to six carbon atoms inclusive, and having a solubility in water at 20° C. of not more than about 125 grams per liter using an alcohol: aqueous solution ratio between about 1:1 and about 1.5:1, whereby a solution of nicotinic acid in the alcohol substantially free of inorganic impurities is obtained.

MILLARD S. LARRISON.

REFERENCES CITED

The following references are of record in the file of this patent:

UNITED STATES PATENTS

| Number | Name | Date |
| --- | --- | --- |
| 2,314,843 | Hultquist | Mar. 23, 1943 |
| 2,447,234 | Tattershall | Aug. 17, 1948 |
| 2,449,906 | Mueller | Sept. 21, 1948 |
| 2,578,672 | Corson | Dec. 18, 1951 |

OTHER REFERENCES

Sherwood: "Adsorption and Extraction," p. 247, 1937, McGraw-Hill.

Perry: Chemical Engineering Handbook, 2nd. edition, 1941, pgs. 1214 and 1215.

Chemical Engineering Handbook 3rd. edition 1950, pp. 714, 715.